United States Patent
Watanabe et al.

(10) Patent No.: US 7,488,770 B2
(45) Date of Patent: Feb. 10, 2009

(54) METHOD FOR PRODUCTION OF POLYCHLOROPRENE LATEX IN ETHYLENE-VINYL-ACETATE COPOLYMER

(75) Inventors: Kosuke Watanabe, Itoigawa (JP); Motohiro Ose, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 625 days.

(21) Appl. No.: 10/557,845

(22) PCT Filed: May 21, 2004

(86) PCT No.: PCT/JP2004/007298

§ 371 (c)(1),
(2), (4) Date: Nov. 21, 2005

(87) PCT Pub. No.: WO2004/104061

PCT Pub. Date: Dec. 2, 2004

(65) Prior Publication Data

US 2007/0043165 A1   Feb. 22, 2007

(30) Foreign Application Priority Data

May 21, 2003   (JP) .............................. 2003-142946

(51) Int. Cl.
| | |
|---|---|
| C09J 111/02 | (2006.01) |
| C08F 2/24 | (2006.01) |
| C08F 2/44 | (2006.01) |
| C08F 263/04 | (2006.01) |
| C08F 36/18 | (2006.01) |
| C08F 289/00 | (2006.01) |
| C08F 291/02 | (2006.01) |

(52) U.S. Cl. .................. 524/534; 524/458; 524/459; 524/501; 524/503; 524/520; 524/552; 526/201; 526/202

(58) Field of Classification Search ................. 524/534, 524/458, 459, 501, 503, 520, 55; 526/201, 526/202

See application file for complete search history.

(56) References Cited

U.S. PATENT DOCUMENTS

2005/0182173 A1 * 8/2005 Yashima et al. ............. 524/430

FOREIGN PATENT DOCUMENTS

| JP | 2000-302809 | 10/2000 |
|---|---|---|
| JP | 2000-303043 | 10/2000 |
| JP | 2001-19805 | 1/2001 |
| JP | 2003-73635 | 3/2003 |
| JP | 2003-313368 | 11/2003 |
| JP | 2004-189964 | 7/2004 |
| WO | WO 03/089511 A1 | 10/2003 |

OTHER PUBLICATIONS

JIS K6854-3, pp. 140-143. Jan. 31, 2003.

* cited by examiner

*Primary Examiner*—Kelechi C Egwim
(74) *Attorney, Agent, or Firm*—Oblon, Spivak, McClelland, Maier & Neustadt, P.C.

(57) ABSTRACT

A polychloroprene latex is provided with excellent adhesive strength, particularly for an EVA material, by dissolving an ethylene/vinyl acetate copolymer in a chloroprene monomer alone or in a mixture of a chloroprene monomer and a monomer copolymerizable with chloroprene to prepare a monomer solution, which is emulsified and dispersed in an aqueous solution containing an emulsifier and/or a dispersant, followed by polymerization to produce a polychloroprene latex. The obtained polychloroprene latex can provide improved adhesive strength particularly for an EVA material.

20 Claims, No Drawings

METHOD FOR PRODUCTION OF POLYCHLOROPRENE LATEX IN ETHYLENE-VINYL-ACETATE COPOLYMER

TECHNICAL FIELD

The present invention relates to a process for producing a polychloroprene latex suitable as a material for an aqueous adhesive, and a polychloroprene latex composition produced by the production process.

The polychloroprene latex composition obtainable by the present invention is suitably used as a material for an aqueous adhesive to be used for adhesion of an adherend particularly a material containing an ethylene/vinyl acetate copolymer (hereinafter referred to as EVA).

BACKGROUND ART

In production of shoes, particularly in production of sport shoes, EVA materials such as EVA foams are widely used for inner sole and midsole portions, etc. Heretofore, for adhesion of EVA, a solvent type adhesive such as a polychloroprene type has been used. However, a solvent type adhesive is unfavorable in view of safety and sanitation of workers and environment, since a large amount of an organic solvent such as toluene, hexane, cyclohexane, heptane, ethyl acetate or methyl ethyl ketone is used.

Accordingly, demand for an aqueous adhesive is increasing year after year, and several proposals have already been made (JP-A-2000-303043 (claim 3, Examples 1 to 6), JP-A-2001-19805 (claim 4, Examples 1 to 3)). However, such conventional aqueous adhesives are insufficient in normal state strength and water resistant strength, and there are still various problems practically.

DISCLOSURE OF THE INVENTION

Under these circumstances, it is an object of the present invention to provide a polychloroprene latex composition having adhesive strength comparable to that by an adhesion method employing a conventional solvent type adhesive, when used as a material for an aqueous adhesive to be used particularly for adhesion of an EVA material, and its production process.

The present inventors have conducted extensive studies to achieve the above object and as a result, found that a polychloroprene latex produced by dissolving an ethylene/vinyl acetate copolymer in a chloroprene monomer alone or in a mixture of a chloroprene monomer and a monomer copolymerizable with chloroprene, emulsifying and dispersing the obtained monomer solution in an aqueous solution containing an emulsifier and/or a dispersant, followed by polymerization, provides favorable adhesive strength particularly for an EVA adherend. The present invention has been accomplished on the basis of this discovery.

Namely, the present invention provides the following:

(1) A process for producing a polychloroprene latex, which comprises dissolving an ethylene/vinyl acetate copolymer in a chloroprene monomer alone or in a mixture of a chloroprene monomer and a monomer copolymerizable with chloroprene, emulsifying and dispersing the obtained monomer solution in an aqueous solution containing an emulsifier and/or a dispersant, followed by polymerization.

(2) The process for producing a polychloroprene latex according to the above (1), wherein the mass ratio of ethylene/vinyl acetate in the ethylene/vinyl acetate copolymer is within a range of from 60/40 to 95/5.

(3) The process for producing a polychloroprene latex according to the above (1) or (2), wherein a polyvinyl alcohol is used as the dispersant.

(4) The process for producing a polychloroprene latex according to any one of the above (1) to (3), wherein methacrylic acid is used as the monomer copolymerizable with chloroprene.

(5) The process for producing a polychloroprene latex according to any one of the above (1) to (4), wherein the ethylene/vinyl copolymer is dissolved in 20 to 80 mass % of the monomer or the monomer mixture to be used for the polymerization, and the obtained monomer solution is emulsified and dispersed in the aqueous solution containing an emulsifier and/or a dispersant to initiate the polymerization, and after the initiation of the polymerization, the rest of the monomer or the monomer mixture is added to the polymerization system.

(6) A polychloroprene latex composition produced by the process as defined in any one of the above (1) to (5).

(7) An aqueous adhesive employing the polychloroprene latex composition as defined in the above (6).

(8) The aqueous adhesive according to the above (7), wherein an adherend is a material containing an ethylene/vinyl acetate copolymer.

BEST MODE FOR CARRYING OUT THE INVENTION

Now, the present invention will be explained in detail below.

The chloroprene to be used in the present invention is also called 2-chloro-1,3-butadiene. Industrially, so-called acetylene process of producing it from acetylene via monovinyl acetylene and so-called butadiene process of producing it from butadiene via 3,4-dichloro-1-butene have been known.

The monomer copolymerizable with chloroprene to be used in the present invention may, for example, be 2,3-dichloro-1,3-butadiene, 1-chloro-1,3-butadiene, butadiene, isoprene, styrene, acrylonitrile, acrylic acid or its ester, or methacrylic acid or its ester, and two or more of them may be used as the case requires. Particularly, copolymerization of an unsaturated carboxylic acid represented by acrylic acid, methacrylic acid, maleic acid or fumaric acid is preferred in view of adhesive force. Copolymerization of methacrylic acid is particularly preferred in view of copolymerizability with chloroprene.

In a case where a mixture of a chloroprene monomer and a monomer copolymerizable with chloroprene is used in the present invention, their ratio is not particularly limited. However, in a case where an unsaturated carboxylic acid is used as the copolymerizable monomer, the mass ratio of the chloroprene monomer/the unsaturated carboxylic acid is preferably from 99.5/0.5 to 90/10, particularly preferably from 99/1 to 95/5, in view of adhesive strength, emulsification stability, etc.

A copolymerizable monomer other than an unsaturated carboxylic acid is used in some cases for the purpose of obtaining soft feeling of the adhesive layer after drying or extending the adhesion-holding time. In such a case, the mass ratio of the chloroprene monomer/the monomer copolymerizable with chloroprene is preferably from 99/1 to 50/50, particularly preferably from 98/2 to 90/10.

It is possible to use an unsaturated carboxylic acid and a monomer other than an unsaturated carboxylic acid as the monomer copolymerizable with chloroprene. In such a case, the mass ratio of the chloroprene monomer/the unsaturated carboxylic acid/the monomer copolymerizable with chloroprene other than the unsaturated carboxylic acid is preferably from 98 to 50/0.5 to 10/1 to 50, more preferably from 98 to 90/1 to 5/2 to 10.

The ethylene/vinyl acetate copolymer (hereinafter referred to as EVA) to be used in the present invention is a copolymer of ethylene with vinyl acetate, and the copolymerization ratio, the copolymerization method, etc. of ethylene and vinyl acetate are not particularly limited, and any EVA may be used. However, in view of adhesive strength, it is preferred to use an EVA having a high ethylene proportion, having a mass ratio of ethylene/vinyl acetate of preferably from 60/40 to 95/5, particularly preferably from 70/30 to 85/15. Further, an EVA having a monomer other than ethylene and vinyl acetate, such as an acrylate, copolymerized may also be used.

In the present invention, EVA is dissolved in a chloroprene monomer alone or in a mixture of a chloroprene monomer and a monomer copolymerizable with chloroprene, and the obtained monomer solution is subjected to emulsion polymerization so that the chloroprene monomer alone or the chloroprene monomer and the monomer copolymerizable with chloroprene are polymerized, to produce a polychloroprene latex. The amount of EVA dissolved in the chloroprene monomer alone or in the mixture of a chloroprene monomer and a monomer copolymerizable with chloroprene is not particularly limited. However, EVA is preferably from 1 to 50 parts by mass, particularly preferably from 5 to 20 parts by mass, per 100 parts by mass of the monomer in view of solubility and adhesive strength.

The emulsifier and/or the dispersant to be used for the emulsion polymerization for the polychloroprene latex of the present invention is not particularly limited. The emulsifier and the dispersant may be different substances or may be the same substance. The emulsifier is one of surfactants and is a substance, by addition of a small amount of which a stable emulsion can easily be prepared, and a surfactant, a soap, rosin, gum Arabic, albumin, agar and the like have been known. Further, the dispersant is a substance which makes fine particles be easily dispersed in rubber or a liquid, and a polyvinyl alcohol, carboxymethyl cellulose, a surfactant, alumina, talc and the like have been known.

As the emulsifier and/or the dispersant in the present invention, anionic, nonionic and cationic surfactants which have been used for a chloroprene latex can be used. Examples of an anionic surfactant include a carboxylic acid type, a sulfonic acid type and a sulfate type, and an alkali metal salt of resin acid, an alkyl sulfonate having from 8 to 20 carbon atoms, an alkyl aryl sulfate, and a condensate of sodium naphthalenesulfonate and formaldehyde may, for example, be mentioned. Examples of a nonionic surfactant include a polyvinyl alcohol or its copolymer (such as a copolymer with acrylamide), a polyvinyl ether or its copolymer (such as a copolymer with maleic acid), a polyvinyl pyrrolidone or its copolymer (such as a copolymer with vinyl acetate), chemically modified products of such (co)polymers, and a cellulose derivative (hydroxyethyl cellulose). Examples of a cationic surfactant include an aliphatic amine salt and an aliphatic quaternary ammonium salt, and octadecyltrimethylammonium chloride, dodecyltrimethylammonium chloride and dilauryldimethylammonium chloride may, for example, be mentioned.

In the present invention, it is preferred to use a nonionic emulsifier and/or dispersant, and more preferred is use of a polyvinyl alcohol.

The amount of the emulsifier and/or the dispersant added in polymerization for production of a polychloroprene latex in the present invention is preferably from 0.5 to 20 parts by mass, particularly preferably from 1 to 5 parts by mass, per 100 parts by mass of the total amount of the monomer initially charged. If the addition amount is less than 0.5 part by mass, emulsification power may be insufficient, and if it exceeds 20 parts by mass, water resistant adhesive force may decrease. The polymerization temperature in the present invention is not particularly limited, but the polymerization temperature is preferably from 0 to 50° C. so that the polymerization reaction will smoothly proceed.

As a polymerization initiator, a persulfate such as potassium persulfate or an organic peroxide such as tert-butylhydroperoxide may, for example, be preferably used, but the initiator is not limited thereto.

For the polymerization, it is common to use a chain transfer agent for the purpose of adjusting the molecular weight. The chain transfer agent to be used is not particularly limited, and one usually used for emulsion polymerization of chloroprene may be used. For example, a known chain transfer agent such as a long chain alkyl mercaptan such as n-dodecyl mercaptan or tert-dodecy mercaptan, a dialkyl xanthogen disulfide such as diisopropyl xanthogen disulfide or diethyl xanthogen disulfide, or iodoform may be used.

A polymerization terminator (polymerization inhibitor) of polychloroprene is not particularly limited, and it may, for example, be 2,6-tert-butyl-4-methylphenol, phenothiazine or hydroxylamine.

In the present invention, as a means of emulsion polymerizing the chloroprene monomer alone or the chloroprene monomer and the monomer copolymerizable with chloroprene, known one may be employed. For the emulsion polymerization, it is not necessarily required that all the amount of the chloroprene monomer alone or the mixture of a chloroprene monomer and a monomer copolymerizable with chloroprene is supplied to the polymerization system all at once, but it can be dividedly supplied to the polymerization system. For example, a part of the monomer or the monomer mixture to be used for the polymerization, preferably from 20 to 80 mass % of the entire monomer or the monomer mixture, is used to dissolve EVA, the emulsion polymerization is initiated using the obtained monomer solution, and after the initiation of the polymerization, the rest of the monomer or the monomer mixture is added to the polymerization system all at once or dividedly and successively to carry out the polymerization. Such a method has such an advantage that the polymerization reaction of the monomer is likely to be controlled.

The final degree of polymerization of the polychloroprene is not particularly limited and can optionally be adjusted, and an unreacted monomer is removed by monomer removal operation, and its method is not particularly limited.

The polychloroprene latex of the present invention may be concentrated or diluted by addition of water or the like to control the solid content concentration in the latex to a required concentration. The concentration method may, for example, be vacuum concentration, but it is not particularly limited.

In the present invention, the structure of the polychloroprene latex is not particularly limited, and it is possible to adjust the solid content concentration, the molecular weight of toluene-soluble matter, the toluene-insoluble matter (gel content), etc. by appropriately selecting and controlling the polymerization temperature, the polymerization initiator, the chain transfer agent, the polymerization terminator, the final degree of polymerization, the monomer removal, the concentration conditions, etc.

In view of balance between the initial adhesive force and the normal state adhesive force, the gel content of the (co) polymer in the polychloroprene latex is adjusted to preferably from 3 to 60 mass %, particularly preferably from 20 to 40 mass %.

In a case where the polychloroprene latex composition of the present invention is used as an aqueous adhesive, it is preferred to incorporate an adhesion-imparting resin in an amount of preferably from 10 to 100 parts by mass per 100 parts by mass of the solid content of the polychloroprene latex composition so that characteristics such as initial adhesive force, water resistant adhesive force and adhesion-holding time are more practically balanced.

In a case where an adhesion-imparting resin is incorporated in the aqueous adhesive, the type is not particularly limited. Specifically, it may, for example, be a rosin resin, a polymerized rosin resin, an α-pinene resin, a β-pinene resin, a terpene phenol resin, a C5 petroleum resin, a C9 petroleum resin, a C5/C9 petroleum resin, a DCPD petroleum resin, an alkylphenol resin, a xylene resin, a coumarone resin or a coumarone-indene resin. Preferred is a resin having a softening temperature of from 50 to 160° C. so as to obtain sufficient initial adhesive force.

The method of adding the adhesion-imparting resin is not particularly limited, but it is preferably added in the form of an aqueous emulsion so that the resin is uniformly dispersed in the latex composition. The method of forming the adhesion-imparting resin into an aqueous emulsion, (a) a method of emulsifying/dispersing a solution having the adhesion-imparting resin dissolved in an organic solvent such as toluene in water by employing an emulsifier and then removing the organic solvent by heating while the pressure is reduced, and (b) a method of grinding the adhesion-imparting resin into fine particles, and emulsifying and dispersing the fine particles in water by employing an emulsifier, may, for example, be mentioned, and the former is preferred, by which an emulsion comprising finner particles can be prepared.

To the polychloroprene latex composition of the present invention, in addition to the above components, a thickener, a metal oxide, a filler, a film-forming aid, an ultraviolet absorber, an antioxidant, a plasticizer, a vulcanizing agent, a vulcanization accelerator, an antifoaming agent or the like may optionally be added depending upon the performance required.

The application of the adhesive of the present invention is not particularly limited, and the adhesive is suitably used in various fields. It is particularly suitable for adhesion of an EVA adherend, and it is useful for adhesion of an inner sole laminate or a midsole for production of shoes.

Now, the present invention will be explained in further detail with reference to Examples and Comparative Examples. However, the present invention is by no means restricted to such specific Examples. In the following description, "part(s)" and "%" are based on mass unless otherwise specified.

EXAMPLE 1

Using a reactor having an internal volume of 3 liter, 3.5 parts of a polyvinyl alcohol (PVA403, manufactured by KURARAY CO., LTD.) was dissolved in 96 parts of water in nitrogen atmosphere at 60° C. to prepare a polyvinyl alcohol aqueous solution.

Separately, 5 parts of EVA (EV270, manufactured by DU PONT-MITSUI POLYCHEMICALS CO., LTD.) was dissolved in a mixture comprising 98.5 parts of a chloroprene monomer and 1.5 parts of methacrylic acid. 0.4 Part of octyl mercaptan was added to the obtained EVA monomer solution, and this solution was mixed with the above polyvinyl alcohol aqueous solution cooled to about room temperature to prepare an emulsion. While the emulsion was kept at 45° C., polymerization was carried out employing sodium sulfite and potassium persulfate as initiators to obtain a polychloroprene latex. Then, a 20% diethanolamine aqueous solution was added to the obtained polychloroprene latex to adjust pH to 7, and the polychloroprene latex was concentrated by heating under reduced pressure to adjust the latex to have a solid content of 50 wt %.

Using the polychloroprene latex obtained in Example 1, an aqueous adhesive was obtained in accordance with the adhesive blend formula as shown in Table 1.

As an adherend, an EVA foam sheet of 120 mm (length)× 120 mm (width)×5 mm (thickness) and a canvas woven fabric of the same size were prepared. The above-prepared aqueous adhesive was coated on the EVA foam sheet by a brush in an amount of 50 g/m$^2$ (wet basis). After the sheet was left to stand at room temperature for 30 seconds, the woven fabric was bonded thereto, and the sheet and the woven fabric were pressure bonded at 150° C. for 15 seconds at 0.8 kg/cm$^2$. After the laminate was left to stand at room temperature for one hour, it was heated at 120° C. for 90 seconds and then pressure bonded under 0.5 MPa by cold pressing to obtain a sample.

Normal State Strength

The above obtained sample was cured at room temperature for one day, and a test specimen with a width of 20 mm was cut out. The test specimen was subjected to T-peel test (JIS K6854-3) to determine the normal state strength. The result is shown in Table 1.

Water Resistant Strength

The above obtained sample was cured at room temperature for one day and then immersed in pure water for two days. Moisture on the sample taken out from water was wiped off, and a test specimen with a width of 20 mm was cut out. The test specimen was subjected to T-peel test (JIS K6854-3) to determine the water resistant strength. The result is shown in Table 1.

EXAMPLE 2

In the same manner as in Example 1 except that the type of EVA dissolved in the monomer was changed to EV250 (manufactured by DU PONT-MITSUI POLYCHEMICALS CO., LTD.), a polychloroprene latex was produced, and tests were carried out. The results are shown in Table 1.

COMPARATIVE EXAMPLE 1

In the same manner as in Example 1 except that EVA was not dissolved in the monomer, a polychloroprene latex was produced, and tests were carried out. The results are shown in Table 1. It is found that both normal state strength and water resistant strength significantly decreased as compared with Examples.

COMPARATIVE EXAMPLE 2

In the same manner as in Comparative Example 1, polymerization was carried out with EVA not dissolved in the monomer to produce a polychloroprene latex, and when an adhesive was prepared using this latex, an EVA aqueous dispersion (REZEM EV-3, solid content: 32%, manufactured by CHUKYO YUSHI CO., LTD.) was added. Using this adhesive, tests were carried out in the same manner as in Comparative Example 1, and the results are shown in Table 1. Although favorable normal state strength was obtained, the decrease in the water resistant strength was significant as compared with Examples.

TABLE 1

|  | Ex. 1 | Ex. 2 | Comp. Ex. 1 | Comp. Ex. 2 |
| --- | --- | --- | --- | --- |
| Polymerization formula (part(s) by mass) | | | | |
| Chloroprene | 98.5 | 98.5 | 98.5 | 98.5 |
| Methacrylic acid | 1.5 | 1.5 | 1.5 | 1.5 |
| EVA (EV270) | 5 | — | — | — |
| EVA (EV250) | — | 5 | — | — |
| PVA403 | 3.5 | 3.5 | 3.5 | 3.5 |
| Octyl mercaptan | 0.4 | 0.4 | 0.4 | 0.4 |
| Pure water | 96 | 96 | 96 | 96 |
| Adhesive blend formula (part(s) by mass) | | | | |
| Latex | 100 | 100 | 100 | 100 |
| Adhesion-imparting resin dispersion | 65 | 65 | 65 | 65 |
| Zinc oxide dispersion | 1 | 1 | 1 | 1 |
| REZEM EV-3 | — | — | — | 9 |
| Thickener | 1 | 1 | 1 | 1 |
| Adhesive characteristics | | | | |
| Normal state strength (N/mm) | 1.0 | 1.0 | 0.3 | 1.0 |
| Breakage state | Material failure | Material failure | Adhesive failure | Material failure |
| Water resistant strength (N/mm) | 0.9 | 0.8 | 0.1 | 0.5 |
| Breakage state | Cohesive failure | Cohesive failure | Adhesive failure | Cohesive failure |

EV270: Vinyl acetate amount 28 mass %, mp = 71° C.
EV250: Vinyl acetate amount 28 mass %, mp = 72° C.
REZEM EV-3: Vinyl acetate amount 28 mass %, softening point 90° C.
Adhesion-imparting resin dispersion: Tamanol E-100 (manufactured by ARAKAWA CHEMICAL INDUSTRIES, LTD.)
Zinc oxide dispersion: AW-SW (manufactured by OSAKI INDUSTRIES, CO., LTD.)
Thickener: UH-450 (manufactured by ASAHI DENKA CO., LTD.)

INDUSTRIAL APPLICABILITY

As evident from Table 1, the polychloroprene latex composition to be produced by the present invention has excellent adhesive characteristics for an EVA material, and is useful for wide applications including production of shoes.

The invention claimed is:

1. A process for producing a polychloroprene latex, comprising
   dissolving an ethylene/vinyl acetate copolymer in at least one monomer to form a monomer solution;
      wherein the at least one monomer comprises a chloroprene monomer;
   emulsifying and dispersing the monomer solution in an aqueous solution comprising an emulsifier, a dispersant, or a combination thereof, to form a mixture; and
   polymerizing the mixture to produce the polychloroprene latex.

2. The process of claim 1, wherein the at least one monomer further comprises a monomer copolymerizable with chloroprene.

3. A polychloroprene latex produced by the process of claim 2.

4. An aqueous adhesive comprising the polychloroprene latex of claim 2 and an adhesion promoting resin.

5. The process of claim 2, wherein the dispersant is used, and wherein the dispersant is a polyvinyl alcohol.

6. The process of claim 2, wherein the mass ratio of ethylene to vinyl acetate in the ethylene/vinyl acetate copolymer ranges from 60/40 to 95/5.

7. The process of claim 2, wherein the monomer copolymerizable with chloroprene is methacrylic acid.

8. A polychloroprene latex produced by the process of claim 7.

9. An aqueous adhesive comprising the polychloroprene latex of claim 7 and an adhesion promoting resin.

10. The process of claim 7, wherein the dispersant is used, and wherein the dispersant is a polyvinyl alcohol.

11. The process of claim 7, wherein the mass ratio of ethylene to vinyl acetate in the ethylene/vinyl acetate copolymer ranges from 60/40 to 95/5.

12. The process of claim 1, wherein the mass ratio of ethylene to vinyl acetate in the ethylene/vinyl acetate copolymer ranges from 60/40 to 95/5.

13. The process of claim 1, wherein the dispersant is used, and wherein the dispersant is a polyvinyl alcohol.

14. A polychloroprene latex produced by the process of claim 1.

15. An aqueous adhesive comprising the polychloroprene latex of claim 1 and an adhesion promoting resin.

16. The process of claim 1,
   wherein the total amount of the at least one monomer is 100 mass %;
   wherein the ethylene/vinyl copolymer is dissolved in 20 to 80 mass % of the at least one monomer; and
   wherein the polymerizing further comprises initiating polymerization of the mixture and, after initiating polymerization of the mixture,
   adding additional at least one monomer so that the mass % of the at least one monomer totals 100%.

17. A polychloroprene latex produced by the process of claim 16.

18. An aqueous adhesive comprising the polychloroprene latex of claim 16 and an adhesion promoting resin.

19. The process of claim 16, wherein the mass ratio of ethylene to vinyl acetate in the ethylene/vinyl acetate copolymer ranges from 60/40 to 95/5.

20. The process of claim 16, wherein the dispersant is used, and wherein the dispersant is a polyvinyl alcohol.

* * * * *